United States Patent Office

3,535,631
Patented Oct. 20, 1970

3,535,631
APPARATUS FOR DETERMINING THICKNESS VARIATIONS ACROSS ELECTRICALLY CONDUCTIVE MATERIAL
Wilfried Florent De Geest, Berchem-Antwerp, and Josephus Cyrillus Eeman, St. Niklaas, Belgium, assignors to Gevaert-Agfa N.V., Mortsel, Belgium, a company of Belgium
Filed May 15, 1967, Ser. No. 638,525
Claims priority, application Great Britain, May 13, 1966, 21,433/66
Int. Cl. G01r 27/02
U.S. Cl. 324—65       2 Claims

ABSTRACT OF THE DISCLOSURE

Indication of relative variations in the thickness across the width of an electrically connective film, e.g. a web or coating, is obtained by coupling into an A.C. circuit the ends of laterally successive narrow long strips or sections of the film one by one, such strips having the same width and length with each strip being spaced from any adjacent strip a distance which is small compared to the strip width, the circuit including a measuring impedance connected in series with the coupling of one strip end, which impedance is small compared to the resistance of the respective strips and measuring the voltage across the measuring impedance. Deviations in the voltage values thus obtained for the several strips indicate variations in the thickness of such strips. Where the specific resistance of the film is known or measured, the film thickness can be determined quantitatively.

---

The present invention relates to a method for measuring the resistance of strips of electrically conductive materials forming yarns, webs, coatings or the like. More particularly the invention relates to the contactless measuring of the thickness of a wet layer coated onto a moving web.

In the production of cellulose, plastics, and other materials which are produced in continuous webs, or in the coating of or generally in the application of layers such as subbing layers, light-sensitive layers and others onto continuous moving webs, it is very desirable to ascertain the thickness of the produced material as soon and as quickly as possible.

This involves a difficult problem however due to the fact that at the time when the thickness should be measured, the sensitiveness of the material surface is so great that bodily contacts therewith should be avoided.

This invention is based on the idea of using the electrical resistance of a strip of material as a measure of its thickness.

According to the present invention, the method for determining the resistance of a strip of electrically conductive material forming a yarn, web, coating or the like, comprises the steps of passing an A.C. current through such strip by coupling both ends of said strips to a source of A.C. current, the said coupling occurring at least at one end capacitively, and determining said resistance from an electric value or values obtained in the electric circuit.

The said determination may be effected by measuring the electric current in the circuit in case the circuit is fed by a constant A.C. tension. In case the circuit is fed by a constant A.C. current, the tension which is produced over the circuit may be measured.

The described technique is not to be avoided with known devices for measuring the thickness of webs or coatings thereon by ascertaining the capacity of a capacitor after the introduction of the web as a dielectric.

The invention includes any apparatus or electrical system constructed to enable it to be used in performing any method as above defined, particularly apparatus and systems substantially as hereinafter described with reference to the accompanying drawings.

For the sake of clearness we explain hereinafter some terms which are used in this specification.

The term "strip" includes a length of yarn, thread, or the like, and such length may be but one part of the total length of such yarn, thread or the like. The said term "strip" also includes an elongated portion of a web or coating layer located within the total area of such web or layer, particularly an elongated portion extending longitudinally of the web or layer.

The term "a source of A.C. tension" denotes a proper generator of A.C. tension, but it includes also the tension which, in a given circuit, is present over the terminals of a component such as a resistor, a capacitor, an inductor.

The term "measuring" should unless the context requires otherwise be interpreted broadly to include not only the establishment of an absolute value but also the determination of a relative value. Thus, while it is possible to ascertain the thickness of a strip by calculation from its electric resistance and from the specific resistance of the material of which it is composed, the electric resistance being itself calculated from the current through the strip and the tension over it, the invention also includes mere comparison of the readings resulting from the testing of different strips e.g., in the case of a coating layer on a web, the comparison of the readings obtained for different strips located transversely of the web in order to determine the uniformity of the coating on the web in the transverse direction. The invention can also be performed in order to obtain a reading which is compared with a reference or standard to determine the existence or the existence and degree of divergence from such reference or standard and the comparison may be effected automatically so as to yield impulses or signals applicable in the control of manufacture or treatment of a given material of which the strip under test consitutes a sample. It will thus be apparent that the invention includes methods of testing strips of electrically conductive materials to determine thicknesses or thickness variations.

As the present invention is particularly developed in connection with the measuring of the thickness in the coating of liquid compositions such as pigmented layers, subbing layers, antistress layers, light-sensitive or, in general radiation-sensitive layers, in the manufacture of materials for use in photographic processes, reference is particularly made to such materials in this specification but it is to be understood that the invention has many other potential uses and examples thereof will be given.

For the same reason of development, the description deals particularly with the application of a liquid composition to a web, but it is clear that the invention is also suited for use in the embodiment wherein the liquid composition is a composition for forming a self-supporting sheet, or in an embodiment wherein a composition is forced through a nozzle for forming webs, yarns, etc.

In the case of the coating of a composition onto a web, it is evident that the conductivity of the web or the layer on the web, onto which the coating is applied, shall be substantially lower than that of the coating composition. In this respect, reference will be made further in the description to the coating of an electrically conductive layer onto an electrically insulating web.

Another particular application of the method according to the invention resides in its use for checking the drying of layers coated onto a web, and the like. To this end, the resistance of the coated layer may be measured at an area located near the exit of the drying station, the resistance of the layer which is generally representative for the drying thereof may be used for controlling the temperature or the air circulation in the drying chamber, so as to obtain a sufficient and uniform drying of the webs passed therethrough.

The invention will now be described with reference to the accompanying drawings in which:

FIG. 1b is the electric circuit of the embodiment according to FIG. 1a;

FIG. 2b is the electric circuit of the embodiment according to FIG. 2a;

FIG. 3b is the electric circuit of the arrangement according to FIG. 3a;

FIG. 4b is the electric circuit of the arrangement according to FIG. 4a;

In the drawings, corresponding parts of different arrangements are denoted by the same reference numerals.

Figure 1A:
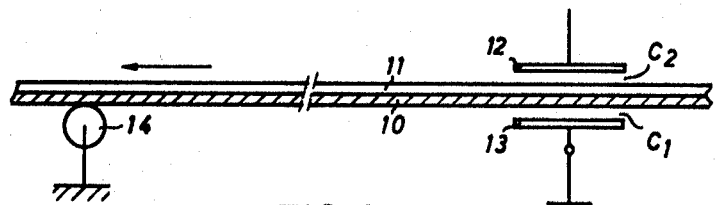
FIG. 1a represents diagrammatically one embodiment for measuring the relative thickness of a coated layer.

Referring first to the embodiment according to FIG. 1a, an electrically insulating web 10 to which a layer 11 from an electrically conductive composition has just been applied, is transported in the direction of the arrow. At either side of the web and parallelly spaced therefrom, are located two flat electrodes 12 and 13 which extend transversely of the web and which are electrically insulated from each other.

With its projection onto the coated layer the electrode 12 constitutes a capacitor which will hereinafter be called $C_2$, the electrode 13 constitutes with the area of the coated layer, which corresponds to the projection onto the backside of the web of said electrode, a capacitor called hereinafter $C_1$.

Figure 1B:
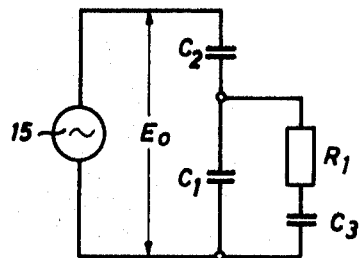

The web is conveyed with the backside over an electrically grounded roller 14. The capacitance between the roller 14 and the corresponding portion of the coated layer is represented hereinafter by $C_3$. The resistance of the coated layer of the strip comprised between the roller 14 and the elctrodes 12, 13, the length of said strips being much greater than the length of the electrodes 12, 13, is indicated by $R_1$. The electrode 13 is grounded, and a generator 15 of A.C. tension is connected between the electrode 12 and the ground. Thus an equivalent electric circuit may be drawn, which is shown in FIG. 1b.

The generator 15 produces an A.C. current in the series circuit constituted by the capacitor $C_2$ and by the parallel circuit of $C_1$ and $R_1$-$C_3$. The current is determined by the values of the mentioned components and by the tension and the frequency of the generator. The impedance of the capacitance $C_3$ being much lower than that of $R_1$, $C_1$ and $C_2$, the said member $C_3$ will be considered hereinafter as having an impedance equal to zero.

The circuit being fed by a constant tension $E_0$, and all components except for $R_1$ being known, the measurement of the current through $R_1$ will permit to determine the value of $R_1$. Since the measurement of the current through $R_1$ will necessitate the insulated mounting of the roller 14 so that a small measuring impedance could be inserted between $C_3$ and the ground, an arrangement is preferred wherein the tension over $R_1$ is measured.

Practically, the measurement of the tension over $R_1$ is done in measuring the tension which develops over $C_1$ lying in parallel to $R_1$. The determination of the tension over $C_1$ occurs in inserting an extra impedance Z between $C_1$ and the ground, and in measuring the tension $E_z$ which develops over said impedance Z (see FIG. 1c). In taking care the said impedance Z is much smaller than the impedances of $C_1$ and $C_2$, the working conditions of the arrangement according to FIG. 1b do not change.

Thus, the tension $E_1$ over $C_1$ is given by:

$$E_1 = E_2 \frac{Z_1}{Z}$$

$Z_1$ being the impedance of $C_1$.

Although the impedance Z may be resistive, it is preferably capacitive and, in such case, is even preferably adjustable so that it can be set to obtain a determined face value after a measuring device with a given input capacitance has been connected.

The A.C. tension $E_z$ measured by the device 16 is a function of the tension $E_0$ and the frequency of the generator 15, the values of $C_1$ and $C_2$, and the value of $R_1$ which directly depends on the thickness, the width, the length and the specific resistance of the coating on the concerned strip. All these parameters are constants, except for the specific resistance and the thickness of the layer.

Provided the specific resistance of the material remains unaltered over the length of the strip, the measured tension $E_z$ may be written as a function of the thickness of the layer 11.

Figure 1C:
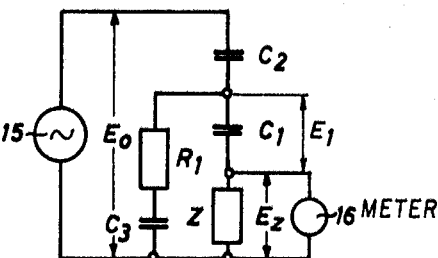
FIG. 1c is the electric measuring circuit.
Figure 1D:
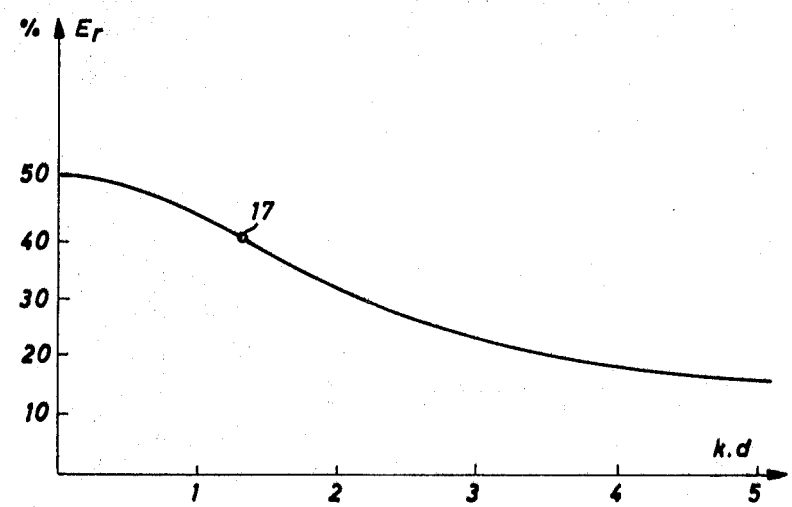
FIG. 1d is a diagram of the relative tension $E_r$ as a function of the thickness $d$.

In the diagram of FIG. 1d the tension $E_1$ over $C_1$ as a function of a layer of varying thickness $d$ is plotted in relative values:

$$E_r = \frac{E_1}{E_0} 100$$

in order to facilitate the comparison of the tension over $C_1$ in the present circuit of FIG. 1c, with the tension over $C_1$ in the circuit of FIG. 2c which will be discussed hereinafter.

The values of the different parameters were as follows.

Distance of the electrodes 12 and 13 from the web: 1 cm.
Area of the electrodes 12 and 13: 5 sq. cm.
Capacitance constituted by the electrodes 12 and 13 and the coated layer: 0.4 pf.
Z was constiuted by a capacitor of 200 pf.
The contact with the coated layer on the web at the left end occurred galvanic. The distance between the point of galvanic contact and the electrodes 12, 13 was 20 cm.
Frequency of the source 15 was 20 kc.

It appears from the diagram that point 17 is a flex point of the curve. The sensitivity of the system is maximum in this point and for small deviations of the thickness from the value which corresponds to the said point, $E_r$ is almost a linear function of the relative thickness represented by $k.d$, $k$ being a constant.

The location of the point 17 on the curve is a function of the different parameters of the electric circuit, and by an appropriate choice of these parameters this point may be made to correspond with the nominal thickness of the coated layer.

In the above description it has been mentioned that the contact with the coated layer occurred at one end by means of the neglectable capacitive impedance $C_3$. It is clear that the contact at said end may also occur galvanic, e.g. by the roller 14 contacting the front-side of the web instead of the back-side in case the coated layer would permit at that stage such bodily contact. In another way, if the course of the web is supposed to be reversed for a moment, the said galvanic contact may be constituted by the metal head or orifice of the coating device, or the periphery of a metal metering roller which meters the coating which has just before been applied to the web.

Figure 2A:
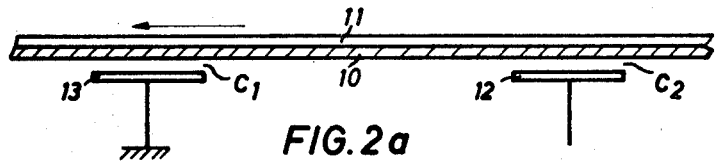
FIG. 2a represents diagrammatically a second embodiment for measuring the relative thickness of a coated layer.

A second embodiment of the invention is shown in FIG. 2a.

A web 10 onto which a layer 11 has just been coated advances in the direction of the arrow. At the back-side of the web are located two electrodes 12 and 13 which extend transversely of the web and which are electrically insulated from each other.

Similarly to the arrangement of FIG. 1, the capacitance of the capacitors formed by the electrodes 12 and 13 and the corresponding area of the coated layer is indicated by $C_1$ and $C_2$, the resistance of the strip of the coated layer extending between the two electrodes is indicated by $R_1$.

Figure 2B:
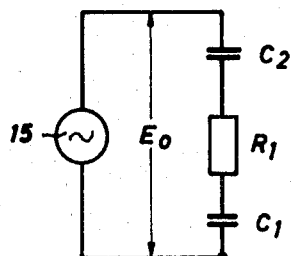

An A.C. generator 15 is connected between the electrodes 12 and 13 and produces an electric current in the circuit represented in FIG. 2b.

The tension $E_0$ being constant, and all components except for $R_1$ being constants, the measurement of the current in the series circuit will permit to determine $R_1$.

The measurement of the current occurs in inserting an extra impedance Z in series with the circuit, the impedance of Z being small in respect of that of $C_1$, and in measuring the A.C. tension $E_Z$ developed over Z by means of a device 16. This arrangement is shown in FIG. 2c.

The electrodes, each consisting of a copper disk of an area of 10 sq. cm., are centrally located at the back-side of the web at a distance therefrom of 0.8 cm., and at a mutual distance of 20 cm. The capacitance of the electrodes amounted to 1 pf., the capacitance of the impedance Z was 500 pf. An A.C. tension generator is used, the frequency of which is adjustable.

Figure 2C:
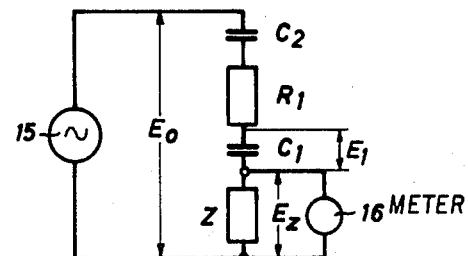
FIG. 2c is the electric measuring circuit.

Since all the parameters of the circuit shown in FIG. 2c are known, except for the resistance $R_1$ which directly depends on the thickness, the width, the length and the specific resistance of the coating on the concerned strip, the tension $E_Z$ will be a function of the relative thickness of the coated layer, in case it may be admitted that the other parameters remain constant.

Figure 2D:
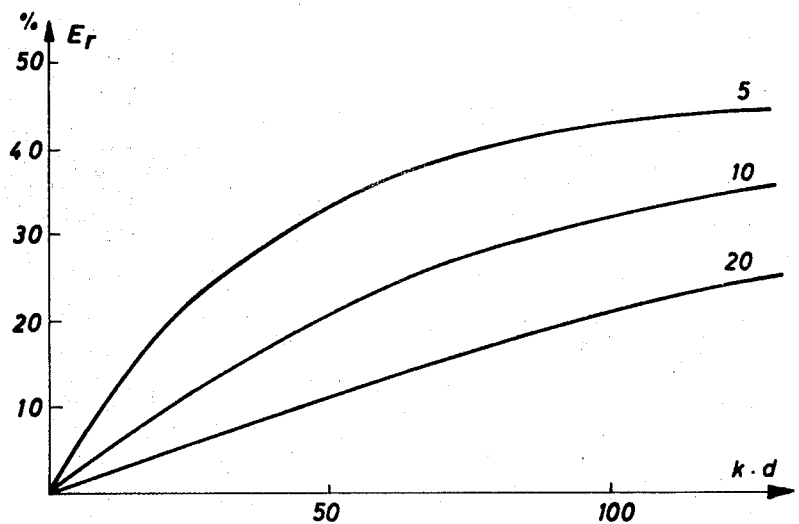
FIG. 2d is a diagram of the relative tension $E_r$ as a function of the thickness $d$ at different frequencies.

The results which were obtained with an arrangement according to FIGS. 2a and 2c are shown in FIG. 2d.

Similarly to what was done in the embodiment described hereinbefore, the tension $E_Z$ has been multiplied by a coefficient so as to obtain the tension over $C_1$:

$$E_1 = E_z \frac{Z_1}{Z}$$

Figure 5:
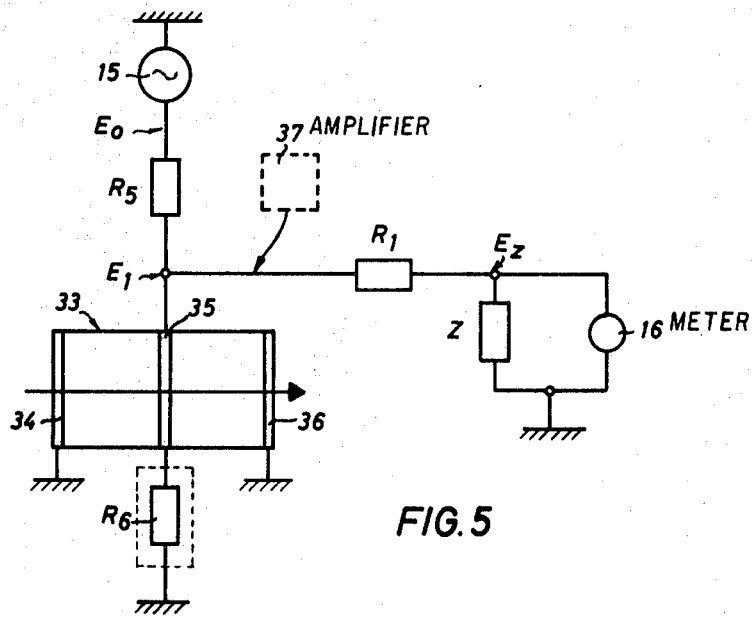
FIG. 5 is an arrangement for measuring the absolute thickness of a coated layer.

$Z_1$ being the impedance of $C_1$, and the tension $E_1$ has been plotted in relative values:

$$E_r = \frac{E_1}{E_0} 100$$

for frequencies of 5, 10 and 20 kc., indicated by the figures 5, 10 and 20, respectively.

When comparing the embodiment of FIG. 2 with that of FIG. 1, it appears that the curve of FIG. 1d generally decreases towards zero for an increase of the thickness $d$, whereas the curves of FIG. 2d generally increase from zero to the value of $E_r = 50\%$ for an increase of $d$.

The three curves which have been obtained for the three different frequencies clearly show the importance of the frequency of the tension $E_0$ upon the measurement. It is therefore necessary to keep the frequency of $E_0$ rigorously constant, or otherwise to take said frequency sufficiently high so that the impedances of $C_1$ and $C_2$ become so small that they may be neglected in respect of $R_1$.

A practical arrangement wherein the latter principle is applied, and which measures the thickness of an applied coating according to the technique of the described second embodiment, is disclosed hereinafter.

Figure 3D:
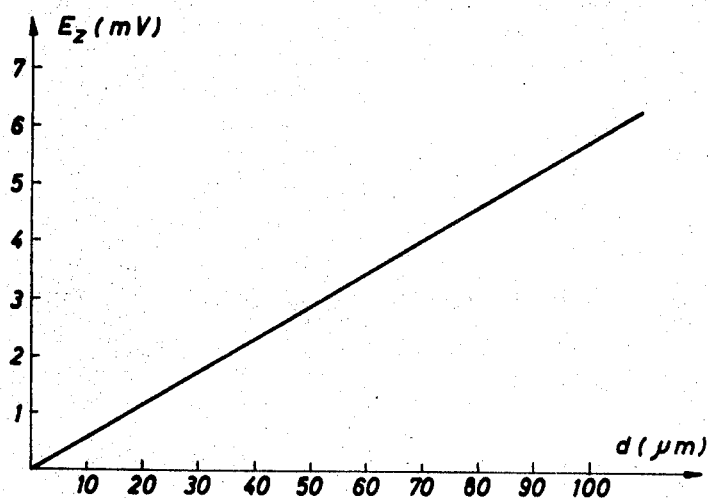
FIG. 3d is a diagram showing $E_3$ as a function of $d$.
Figure 3E:
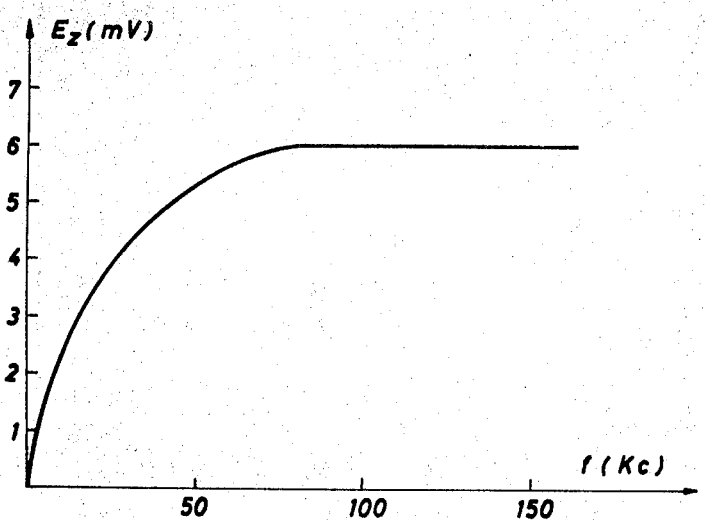
FIG. 3e is a diagram showing the influence of the frequency upon the measurement.
Figure 3A:
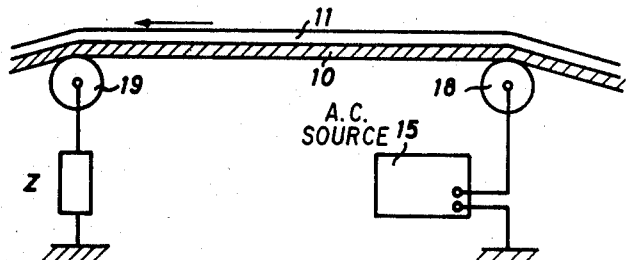
FIG. 3a represents diagrammatically a practical arrangement for measuring the thickness of a coated layer.
Figure 3B:
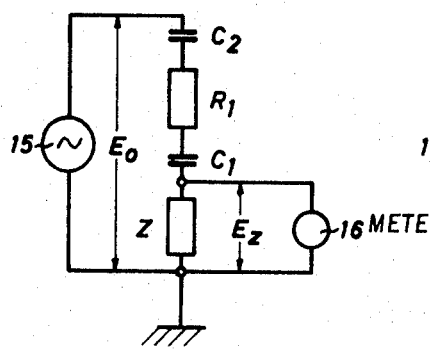

An insulating web 10 to which a coating 11 has just been applied is passed in the direction of the arrow over the conductive backing rollers 18, 19 (FIG. 3a). Said rollers are journalled in an electrically insulating way, and they are connected to an A.C. tension generator 15 and an impedance Z. The rollers 18 and 19 constituting with a corresponding web portion the capacitors $C_2$ and $C_1$, respectively, the equivalent electric circuit of the arrangement looks as shown in FIG. 3b. The measuring device 16 is connected over the impedance Z, in the present case the resistor $R_2$, which is small in respect of $R_1$.

The frequency of the generator is sufficiently high, in order that the impedance of the capacitors $C_1$ and $C_2$ may be neglected in respect of the resistance of $R_1$ and $R_2$.

Two further resistances are involved in the circuit, viz. $R_3$ representing the resistance of the length of material comprised between the web portion contacting the roller 19 and the next conveying roller at the left of the roller 19 where $R_3$ is capacitively grounded through $C_3$ ($C_3$ being the capacitance between this next conveying roller and the contacting web portion) or $R_3$ being the resistance of the length of material comprised between said web portion contacting the roller 19 and the area where the solidified layer is first in electrical contact with the ground, and $R_4$ representing the resistance of the length of material comprised between the web portion contacting the roller 18 and the area at the right side thereof where the wet layer is in electrical contact with the ground, or where the wet layer is capacitively grounded, e.g. through $C_4$ constituted by a grounded backing roller and the corresponding web portion supported thereby. In most cases, $R_4$ will be in direct electrical contact with the ground, viz. at the area where the coating becomes applied to the web.

Figure 3C:
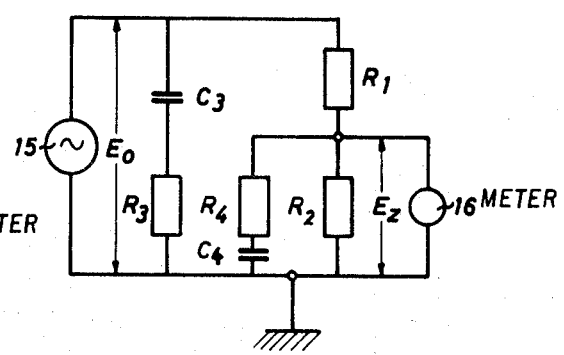
FIG. 3c is the electric measuring circuit.

The electric circuit looks as shown in FIG. 3c. For the sake of completeness $C_3$ and $C_4$ have been shown in the drawing, but it should be understood that in case the grounding of the mentioned resistances $R_3$ and $R_4$ occurs galvanic, the said capacitors $C_3$ and $C_4$ could be thought replaced by a straight connection.

The resistor $R_3$ and the series capacitor $C_3$ lie in parallel over the generator 15, and thus do not change the circuit through $R_1$.

The resistor $R_4$ and the series capacitor $C_4$ lie parallel to $R_2$ and will consequently influence the measurement. In taking care that $R_4$ is much greater than $R_2$, the error introduced by the presence of $R_4$ may be neglected.

The arrangement according to FIG. 3a was used for the following measurement. To a triacetate web of a thickness of 100 µm. and a width of 5 cm., a radiograph emulsion was applied at different thicknesses. The rollers 18, 19 had a length of 5 cm., they contacted the back-side of the web over a peripheral length of 4 cm., and they were placed at a relative distance of 30 cm. The value of the resistor $R_2$ was 68 ohms. The generator 15 delivered an A.C. tension of 30 volts/100 kc. The tension $E_z$ over $R_2$ was measured by means of a preamplifier and an electronic voltmeter.

The measured values of $E_z$ are plotted against the thickness $d$ of the applied emulsion layer in the diagram of FIG. 3d. It appears that for an extended range of thicknesses, the relation between the measured tension $E_z$ and the thickness $d$ is almost linear.

The effect on the measurement, when the frequency of the tension $E_0$ becomes insufficiently high in order to make the impedances of $C_1$ and $C_2$ neglectable, is illustrated in the diagram of FIG. 3e for a layer of a thickness of 100 µm. It appears that up from a frequency of about 80 kc., the measurement becomes independent from the impedances of the capacitors $C_1$ and $C_2$ which become neglectable in respect of the other impedances.

Figure 4A:
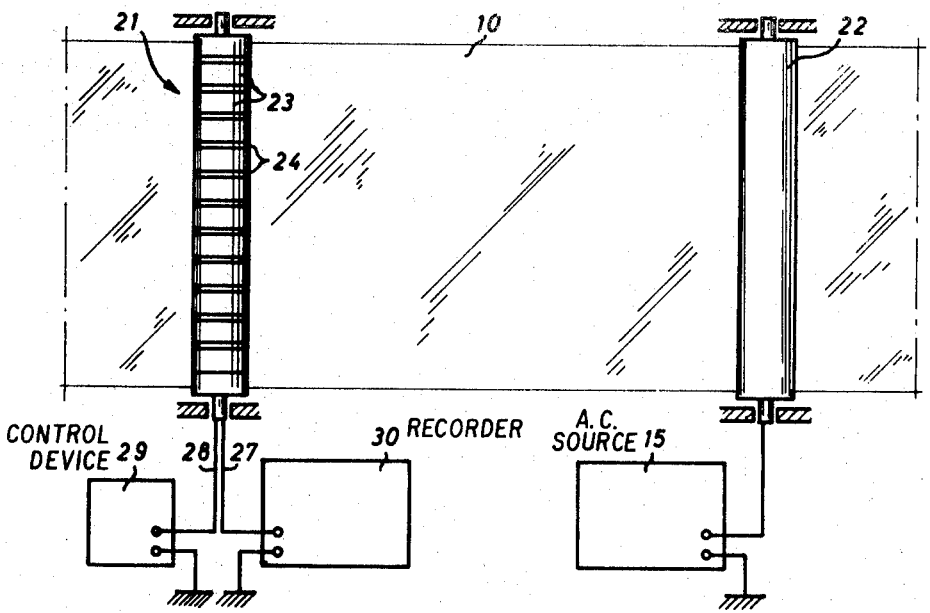
FIG. 4a is a bottom view of an arrangement for measuring the relative thickness of a layer coated on a web, in the transverse direction.

An arrangement which has been used for measuring, in the transverse direction, the uniformity of the thickness of a coating which was applied to a web is shown in FIG. 4a.

A web 10, in the present case a baryta-coated paper web of a width of 120 cm., is transported with its back-side over the rollers 21 and 22. The view is taken from the underside upwardly.

The roller 22 is a free turning steel roller which is electrically insulated in its bearings, and which is connected to an A.C. source 15.

The roller 21 is hollow and comprises a plurality of conductive cylindrical sections 23 which are electrically insulated from each other by insulating rings 24. In the present case, the diameter of said roller was 10 cm., the length of a conductive section was 11 cm., and the thickness of an insulating ring was 5 mm. The mutual distance between the rollers 21, 22 was 50 cm. At the inner side of the roller 21, each section 23 is connected over an impedance Z to a common connection which is grounded. To each impedance Z is connected a miniature preamplifier 25. Further, a step-switch 26 is located in the roller 21, which successively connects the lead 27 to the output of any of the preamplifiers 25. The solenoid 31 of the step-switch is controlled over a lead 28 by a control-device 29. The lead 27 is connected to a recorder 30. The electric contact of the leads 27 and 28 in the rotating roller 21 is in a known way done by means of rings and brushes.

Figure 4B:
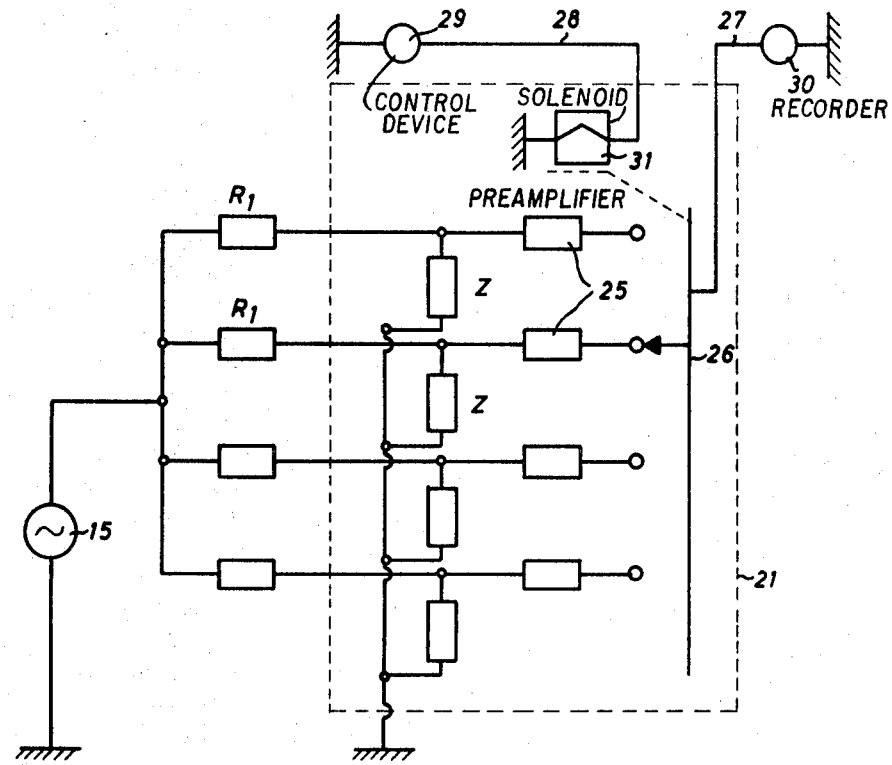

The electric circuit of the arrangement is shown in FIG. 4b. For the sake of simplicity, the equivalent of only 4 of the 12 measuring circuits have been shown. Each resistor $R_1$ represents in the present figure the resistance of the layer on a web strip, extending between the two rollers 21 and 22 and having a width equal to the quotient of the width of the web by the number of transverse strips. Owing to the small spacing between the different roller sections 23, the measured values very closely approach the actual resistance of the concerned strips.

The broken lines in the figure represent the confines of the roller 21 within which the concerned components are located.

With the present arrangement it has been possible to continuously measure the relative thickness of a coating in the transverse direction to an accuracy up to 2%. The arrangement has proved to be very reliable and sturdy in practice. It takes but little space, and it may be easily installed in existing coating installations. It may be placed close to the coating station so that deviations from the intended thickness of the coating may be detected quite soon after coating, and may operate a warning signal or an automatically operating control device so as to arrest or to correct the coating device to limit the loss of material.

The described arrangement is suited for relative measurements. In adding an extra device which continuously measures the specific resistance of the coating composition, and in making said extra device control the current which passes through the measuring circuit, the device 15 may be calibrated directly into grams of applied composition per sq. m.

The electric circuit of a like arrangement is shown in FIG. 5.

The coating composition which is fed to the coating tray is passed through a conduct section 33 which is made of an electrically insulating material. The section is provided at the inner side with three annular electrodes 34, 35 and 36 which are in galvanic contact with the coating composition. The electrodes 34 and 36 are grounded, the electrode 35 is connected over a resistor $R_5$ to an A.C.-generator 15, which delivers an A.C. tension $E_0$.

The electric equivalent of the conduct section 33 are two resistors which are connected in parallel, each resistor representing the resistance as it may be measured between the electrodes 34, 35 and 35, 36. The parallel resistance of said two resistances is represented in the figure by the resistor $R_6$. The tension $E_1$ which exists at the connection of $R_5$ and $R_6$ is given by:

$$E_1 = E_0 \frac{R_6}{R_5+R_6} \simeq E_0 \frac{R_6}{R_5} = E_0 \frac{\rho \cdot L_1}{R_5 \cdot S \cdot 2} \quad (1)$$

$\rho$ being the specific resistance of the coating composition
$L_1$ being the distance between the electrodes 34, 35 and 35, 36
S being the cross-section of the conduct 33
$R_6$ being small in respect of $R_5$ (e.g. $R_6 = 10^3$ ohms, $R_5 = 2.10^5$ ohms).

The tension $E_1$ is applied to an electrode arrangement similar to that described in FIG. 3a, the impedances of the capacitors being neglectable in respect of the resistive impedances because of the sufficiently high frequency of the generator signal.

The tension $E_z$ developed over the measuring impedance Z is given by:

$$E_z = E_1 \frac{Z}{R_1+Z} \simeq E_1 \frac{Z}{R_1} = E_1 \frac{b \cdot d \cdot Z}{\rho \cdot L_2} \quad (2)$$

$b$ being the width of the coated layer
$d$ being the thickness of the coated layer
$L_2$ being the distance between the measuring electrodes 18, 19
$\rho$ being the specific resistance of the coating composition
Z being small in respect of $R_1$.

In substituting the value of $E_1$ of (1) in the Formula 2 we find:

$$E_z = E_0 \frac{\rho \cdot L_1 \cdot b \cdot d \cdot Z}{\rho \cdot L_2 \cdot R_5 \cdot S \cdot 2}$$

thus $E_z = E_0 \cdot K \cdot d$, if K represents a constant.

The tension $E_z$ over Z thus is directly representative for the absolute thickness of the coated layer, irrespective of the specific resistance of the coating composition.

In practice it may occur that the impedance of the circuit over which $E_1$ develops is too high to secure a constant tension $E_1$ upon variations of $R_1$. Therefore, an A.C. amplifier with high input impedance and low output impedance may be inserted in the circuit as shown by 37.

When the device 16 is a recorder, and when for different coating compositions and coating thicknesses it is wanted that the device should always indicate the nominal coating thickness at half the scale, then the feedback circuit of the amplifier 37 may preferably be made adjustable so as to change its amplification factor. Thus, quite different nominal values of the tension $E_1$ and the resistance $R_1$ may cause the same absolute indication of the recording device and deviations from the nominal value will have the same relative magnitude. Thus the scale of the recorder may be calibrated directly in percentage of deviation from the nominal thickness to the left and to the right of a central indication.

In case the impedance of the capacitors in the measuring circuit, e.g. of $C_1$ and $C_2$, is not neglectable in respect of the other impedances, a device may be used instead of the amplifier 37 which has a constant output voltage at low impedance but the frequency of which is a function of the input voltage $E_1$.

Alternatively, the device 37 may produce a constant output current as a function of the input tension $E_1$. The varying resistance $R_1$ then produces a corresponding voltage over the output terminals of the device 37 which may be directly measured with a high impedance voltmeter, and which indicates the thickness of the coating.

The invention is not limited to the described embodiments.

It may be used for measuring the thickness of so-called self-supporting layers. For instance, the invention may be used in the casting of triacetate film. As known in the art, the casting composition is cast onto a continuous copper belt from which it is stripped off after solidifying. The copper belt is provided with a protective mono- or diacetate layer which, in the present case, has the feature of electrically insulating the cast triacetate layer from the conductive belt.

The invention may further be used for measuring the thickness of threads, yarns, or the like. To this end, the electrodes such as 12 and 13 may advantageously have the form of a ring through which the thread or yarn is centrally passed.

In case the specific resistance of the material to be measured is too high, conductive agents may be incorporated into the material so as to enable the measurement under convenient conditions.

As mentioned already in the introduction of the specification, the novel method may be also used for checking or controlling the drying of e.g. layers coated onto webs. To this end, the measuring electrode which is remotest from the coating station may be located at an area where the coated layer is expected to have dried to the desired extent. To each drying situation corresponds a given resistance $R_1$ between the measuring electrodes.

We claim:

1. Apparatus for detecting variations in the thickness of an electrically conductive film transversely across the width thereof as a function of the electrical resistance thereof, which comprises:

a source of high frequency A.C. current, an electrode connected to one terminal of said A.C. source and extending transversely across said film in electrically coupled relation therewith, an array of plural sectional electrodes of common width extending across the film width along a transverse axis spaced longitudinally of the film from said first electrode, each of said electrodes being electrically coupled to a transverse section of said film and being spaced from the next adjacent sectional electrode by a clearance which is substantially less than the width of said transverse section, so that the collective width of said sections is substantially equal to the film width, at least one of (a) said first-mentioned electrode and (b) said plural electrodes being disposed in close electrically insulated relation to said film whereby the coupling of the thus disposed electrodes is a capacitive coupling, means for selectively connecting said sectional electrodes one at a time through a measuring resistance to the other terminal of said A.C. source to establish an electrical path through one of a plurality of transversely spaced longitudinal strips of said film, said resistance being small relative to the electrical resistance through each such longitudinal strip, said A.C. current having a frequency of such magnitude that the impedance of each said capacitive coupling is negligible with respect to the impedance of the respective film strips and of said measuring resistance, and means for determining the voltage established across the corresponding measuring resistance, whereby by comparison of the voltage values thus obtained, indications of the coating thickness across the film width are obtained which reveal any variations therein.

2. Apparatus as in claim 1 including means for measuring the specific resistance of the coating on the web whereby the thickness of said coating can be determined quantitatively from said voltage values.

References Cited

UNITED STATES PATENTS

| | | | |
|---|---|---|---|
| 1,886,508 | 11/1932 | Wierk | 324—61 X |
| 1,924,087 | 8/1933 | Allen | 324—61 |
| 1,984,166 | 12/1934 | Walter | 324—61 X |
| 2,512,372 | 6/1950 | Pakala | 324—61 X |
| 2,535,026 | 12/1950 | Anderson | 324—61 |
| 2,653,298 | 9/1953 | McKinley | 324—65 |
| 3,354,388 | 11/1967 | Perry | 324—65 |
| 3,384,815 | 5/1968 | Lyall et al. | 324—65 |
| 2,231,035 | 2/1941 | Stevens et al. | 324—61 |
| 2,545,576 | 3/1951 | Godley. | |
| 3,391,337 | 7/1968 | Preikschat | 324—61 |

EDWARD E. KUBASIEWICZ, Primary Examiner